US006728672B1

(12) United States Patent
Will

(10) Patent No.: US 6,728,672 B1
(45) Date of Patent: Apr. 27, 2004

(54) SPEECH PACKETIZING BASED LINGUISTIC PROCESSING TO IMPROVE VOICE QUALITY

(75) Inventor: Craig A. Will, Long Barn, CA (US)

(73) Assignee: Nortel Networks Limited, St. Laurent (CA)

( * ) Notice: Subject to any disclaimer, the term of this patent is extended or adjusted under 35 U.S.C. 154(b) by 621 days.

(21) Appl. No.: 09/608,552

(22) Filed: Jun. 30, 2000

(51) Int. Cl.[7] .......... G10L 15/20

(52) U.S. Cl. .......... 704/233; 704/254; 704/270.1

(58) Field of Search .......... 704/231, 233, 704/270.1, 249, 251, 254

(56) References Cited

U.S. PATENT DOCUMENTS

| | | | | |
|---|---|---|---|---|
| 6,167,060 A | * | 12/2000 | Vargo et al. | 370/468 |
| 6,275,797 B1 | * | 8/2001 | Randic | 704/233 |
| 6,483,600 B1 | * | 11/2002 | Schuster et al. | 358/1.15 |
| 6,487,603 B1 | * | 11/2002 | Schuster et al. | 709/231 |
| 6,490,556 B1 | * | 12/2002 | Graumann et al. | 704/233 |
| 6,526,140 B1 | * | 2/2003 | Marchok et al. | 379/406.03 |
| 6,567,388 B1 | * | 5/2003 | Tomcik et al. | 370/335 |
| 6,577,996 B1 | * | 6/2003 | Jagadeesan | 704/236 |
| 6,600,737 B1 | * | 7/2003 | Lai et al. | 370/352 |
| 6,658,381 B1 | * | 12/2003 | Hellwig et al. | 704/216 |

* cited by examiner

*Primary Examiner*—Richemond Dorvil
*Assistant Examiner*—Martin Lerner
(74) *Attorney, Agent, or Firm*—Blakely Sokoloff Taylor & Zafman LLP

(57) ABSTRACT

An embodiment of the present invention is a technique of establishing a telephone communication using a packet switching communications network. Digitized voice information is received from a speaker. The voice information is placed into a payload of a first packet. The first packet is transmitted to a recipient. A significance to voice quality of the voice information contained in the first packet is calculated. One or more additional packets is transmitted to the recipient containing the voice information if the significance of the voice information is above a threshold level. One or more phonemes contained in the voice information is identified. A value from memory for each identified phoneme representing the significance to voice quality of that phoneme is retrieved. The measure of significance for the voice information is set to the maximum of the values for all of the phonemes contained in the voice information.

24 Claims, 4 Drawing Sheets

SPEECH PACKETIZING BASED LINGUISTIC PROCESSING TO IMPROVE VOICE QUALITY

FIELD OF THE INVENTION

This invention relates to telephony and particularly to the transmission of voice information for telephony by a packet-switching digital communications network. More specifically, the invention relates to the improvement of voice quality in a packet-switched telephony system by retransmitting packets that have voice information that is especially significant to voice quality.

BACKGROUND OF THE INVENTION

At the present time there is a substantial desire to transmit voice information in telephony systems by packet-switching digital communications networks. Such transmission has many advantages. For example, by standardizing voice transmission on a single communications network, there are significant economies in transmission costs, maintenance, and billing. It also makes possible integrated services, such as desktop telephones that can offer both voice and data services. For example, Nortel Networks produces a set of telephones, known as "Etherphones", that plug directly into an Ethernet, the communications wiring typically used for personal computers in businesses today. Such telephones can be installed without the need of telephone wiring, and can be operated with servers connected to the same network that function as a PBX. The resulting telephones, which typically have large displays and navigation controls, allow the use of both voice and data services, including Web access.

The primary impediment to the use of packet switching communications networks for transmitting telephony is voice quality. Because the Internet is a "best effort" transmission medium, voice information when placed in packets cannot be guaranteed to reach the listener at the other end of the connection, because the packet may be lost. Such losses typically result from momentary overloads of data in parts of the network, with the network responding by simply discarding packets. In the way that the Internet is typically used for data, lost packets are not a problem because a transmission-acknowledgement-retransmission protocol is used, with packets retransmitted if an acknowledgement has not been received. However, in the case of telephony, the real-time requirements do not allow transmission-acknowledgement-retransmission systems to be practical.

Another problem related to voice quality is delay, which can be disorienting to the user. This delay results in part from the delay introduced by data compression systems and in part by delay introduced by transmission of the packet from source to destination on the network. Current Internet voice telephony systems are generally much lower quality than ordinary "toll grade" telephony, and it is clear that the market for Internet telephony is significantly limited by these quality issues. As microprocessors become faster and cheaper and data compression techniques are developed further compression delays (which are in most systems the major cause of delay) will be substantially reduced, and as the Internet infrastructure develops transmission delays can also be expected to be reduced. However, the degradation in quality due to lost packets will continue to be a significant factor limiting Internet telephony.

Thus, there is a significant need for methods and systems that can avoid or limit the degradation in voice quality resulting from lost packets in Internet telephony. Such methods and-system are disclosed herein in accordance with the invention.

SUMMARY OF THE INVENTION

A method, apparatus, and computer program product for transmitting voice in the form of packets in a packet-switching communication system so as to improve voice quality in an Internet telephony system. The system in particular deals with voice quality problems resulting from lost packets. The system digitizes the voice information, places the result in the payload of a packet, and transmits the packet to the other party of the two-way telephone call.

At the transmitting end of the two-way telephone call, the voice information placed in the transmitted packet is then processed to determine the significance of the voice information in the packet. The processing identifies the phonemes contained in the packet and calculates, based on the identified phonemes, a measure of the significance of the voice information. This can be done by retrieving a constant from memory for each of the identified phonemes and taking the maximum value of the constant of all of the phonemes as the calculated significance of the voice information in the packet. A table in memory maintains these constants, which reflect the different significance of the voice information for different types of phonemes.

The system then compares the calculated significance value with a threshold value. If the significance value exceeds the threshold, the packet is retransmitted. This retransmission occurs after a delay, to allow for clearing of the congestion that presumably resulted in a lost packet. By adjusting the value of the threshold, the level of redundancy (and thus quality) in the transmission can be controlled.

Other aspects and features of the present invention will become apparent to those ordinarily skilled in the art upon review of the following description of specific embodiments of the invention in conjunction with the accompanying figures.

DETAILED DESCRIPTION OF THE INVENTION

Figure 1:
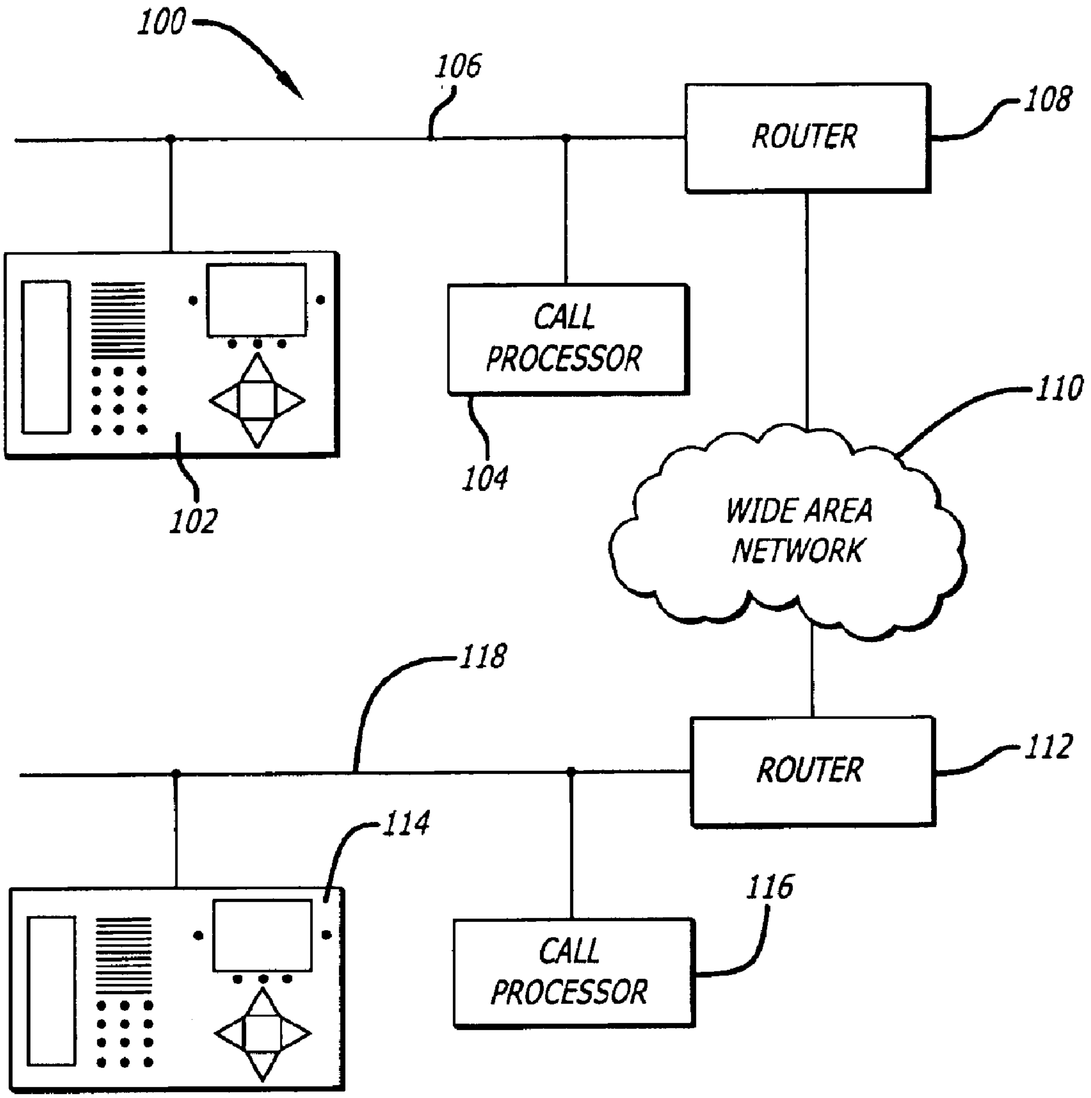
FIG. 1 illustrates a block diagram of an exemplary telecommunications system in accordance with the invention.

FIG. 1 illustrates a block diagram of an exemplary telecommunications system 100 in accordance with the invention. The telecommunications system 100 comprises at a first location a network telephone 102 (e.g. a Nortel Networks model i2004 Etherphone) and a call processor 104 communicatively coupled together by way of a local area network (LAN) 106. Similarly, the telecommunications system 100 comprises at a second location a network telephone 114 (e.g. a Nortel Networks model i2004 Etherphone) and a call processor 116 communicatively coupled together by way of a local area network (LAN) 118. The two local area networks (LANs) may be communicatively coupled together by way of a router 108 (or a series of routers bridges, switches, and/or other network devices), a wide area network 110 (such as a private network or a virtual private network using the Internet with appropriate encryption (e.g. a corporate intranet), or a public network such as the Internet), and a router 112 (or a series of routers, bridges, switches, and/or other network devices).

A user at the network telephone 102 at the first location may desire a two-way telephony connection with a user at the network telephone 114 at the second location. Once the two-way telephony connection has been established, voice from the user at the network telephone 102 can be sent to the user at the network telephone 114 in the form of packets containing digitized segments of the voice. This is accomplished by the network telephone 102 digitizing the user's voice and placing digitized segments of the voice into packets. The voice packets are then sent to the call processor 104 which compresses the voice data, and sends the compressed voice data to the call processor 116 at the second location by way of the router 108, the wide area network 110, and router 112. The call processor 116 decompresses the voice packets into an analog voice signal, amplifies it, and presents it to the user at the second location by way of a speaker. When the user at the second location speaks, the voice transmission operates in the same way, only in the reverse direction.

The above voice transmission over a packet-switch network exemplifies the typical voice transmission that occurs in prior art telecommunications systems. The problem with prior art telecommunications systems is that the packet-switching networks involved transmit data packets in a "best effort" manner. That is, voice information when placed in packets cannot be guaranteed to reach the user at the other end. Such losses typically result from momentary overloads of data in parts of the network, with the network responding by simply discarding packets. Typically with non-time sensitive data transmissions, lost packets are not a problem because a transmission-acknowledgement-retransmission protocol is used, with packets retransmitted if an acknowledgement has not been received. However, in the case of telephony, the real-time requirements do not allow transmission-acknowledgement-retransmission systems to be practical.

Whether a lost voice packet generally presents a problem to the listener depends on the significance of the information to voice quality in the packet. The significance of the information to voice quality depends on the kinds of linguistic units (e.g. phonemes) of the speech present in the voice packet. Phonemes are basic sound units from which words are built upon. The English language has about 51 different phonemes. English phonemes can be broken into two categories, vowel and consonant phonemes. And, English consonant phonemes can be further broken into several subcategories, such as stops, nasals, fricatives, affricates, and approximants.

Vowels are the resulting sounds that occur when a person's vocal tract is substantially open, and therefore have relatively high energy. Stop consonants are the resulting sounds that occur when a person's vocal tract is substantially blocked. Examples of stop consonants include the "p" as in Paul, "t" as in Tom, and the "b" as in Bill. Nasal consonants are the resulting sounds that occur when a person's nasal tract is acoustically coupled to the vocal tract. Examples of nasal consonants include "m" as in Mary and "n" as in Nancy. Fricative consonants are the resulting sounds that occur when a person's vocal tract is not closed, but the stricture is so narrow that air flowing through it is made turbulant. Examples of fricative consonants include "f" as in Frank, "s" as in Sam, and "th" as in Thelma. Affricative consonants are audible fricatives during the release of a stop closure. Examples of affricative consonants include "ch" as in Chuck and "g" as in Ginger. Approximants consonants include a lesser degree of stricture in the vocal tract than a vowel. Examples of approximants consonants include "l" as in Larry, "w" as in Wanda, and "r" as in Richard.

In terms of the significance of the speech to voice quality, certain phonemes are not as significant to voice quality as others. For example, vowels because of their high energy are readily distinguishable from other vowels and consonants. Thus, vowels are relatively not that significant to voice quality as other phonemes. Stop consonants, on the other hand, are more significant to voice quality because they are not readily distinguishable from other stop consonants. Accordingly, the words "bark," and "park" each beginning with the stop consonants of "b" and "p" are not as readily distinguishable from each other as say the words "bare" and "bore", which have different vowels of "a" and "o". Whereas, fricative consonants are not as generally distinguishable as vowels but are more generally distinguishable as stop consonants. Therefore, if a lost voice packet contains a stop consonant, then the voice quality of the speech is typically degraded more than if the lost voice packet had a vowel.

Accordingly, a general concept of the invention is to ascertain the significance of the information in the voice packet to the voice quality, and if that significance is above a threshold, transmit one or more duplicate voice packets. Thus, by transmitting one or more duplicate voice packets, the likelihood that the voice packet is received at the other end has increased. This generally translates to an overall improvement in the voice quality of the transmission between two calling parties. Preferably, there is a delay between the time the first voice packet was transmitted and the time the following duplicate voice packet was transmitted. This is done to attempt to avoid the same network environment condition that presumably resulted in the first transmitted packet being lost, such as a momentary overload of data in a part of the network. The delay could be, for example, 50 to 200 milliseconds.

Figure 2:
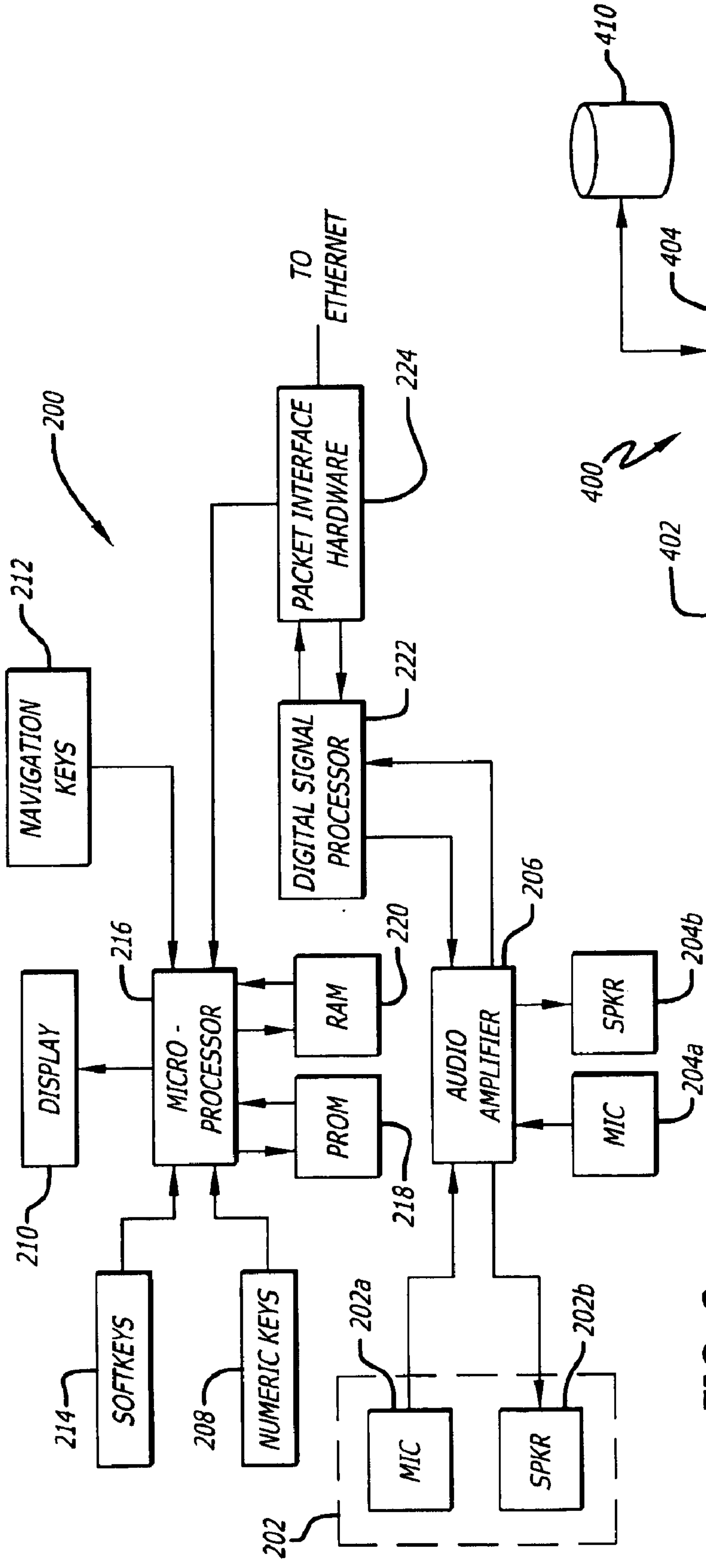
FIG. 2 illustrates a block diagram of an exemplary network telephone in accordance with the invention.

FIG. 2 illustrates a block diagram of an exemplary network telephone 200 in accordance with the invention. Again, an example of a network telephone 200 is the Nortel Networks model i2004 Etherphone. However, other network telephones can be used in the telecommunications systems described herein. The network telephone 200 comprises a handset 202 including microphone 202*a* and speaker 202*b*, a microphone 204*a* and speaker 204*b* for speakerphone use, and an audio amplifier(s) 206 for amplifying outgoing audio from the microphones 202*a* and 204*a* and for amplifying incoming audio for the speakers 202*b* and 204*b*. The network telephone 200 further includes input/output devices, such as a key pad 208 for dialing a telephone number or other alphanumeric code for accessing a telephone user at another end of a two-way telephony communication, a display 210 for displaying available functions and information including network data, navigation keys 212 for navigating through the information and/or data on the display screen, and soft keys 214 for making selections of available functions.

The network telephone 200 further includes a microprocessor 216 which may be coupled to a programmable read only memory (PROM) 218 and random access memory (RAM) 220, for performing and/or controlling the various functions of the telephone through the use of software stored in the PROM 218 and RAM 220. Such functions include the compressing and decompressing of voice information, and the packetizing and depacketizing of voice information. The microprocessor 216 is coupled to each of the input/output devices of the network telephone 200. The network telephone 200 may further include a digital signal processor 222 for compressing and decompressing of audio data, and a packet interface hardware 224 for packetizing and depacketizing of data packets, including voice packets.

In operation, when a user speaks into either microphone 202*a* or 204*a*, the audio signal generated is sent to the audio amplifier 206 for amplification of the signal, and then optionally sent to the digital signal processor 222 for compressing of the audio signal. The compressed digitized audio data is then sent to the packet interface 224 for incorporating the compressed data into voice packets for transmission on the network (e.g. an Ethernet network). When voice packets are received from a remote telephone, the packets are depacketized by the packet interface hardware 224 and optionally sent to the digital signal processor 222 for decompressing of the audio data. Once the audio data has been compressed, it is converted into an analog audio signal which is then sent to the audio amplifier 206 for amplification, and then to either one of the speakers 202*b* or 204*b* for presentation to the user of the network telephone 200.

Figure 3:
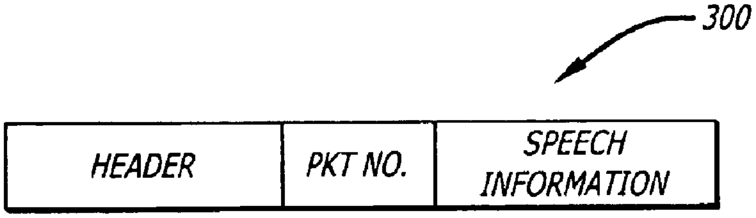
FIG. 3 illustrates an exemplary data structure of a voice packet in accordance with the invention.

FIG. 3 illustrates an exemplary data structure of a voice packet 300 in accordance with the invention. The voice packet 300 comprises a header field, a packet number field, and a payload field including digitized and compressed speech information. The header field includes such information as the destination address, source address, and possibly other information. The packet number identifies the packet in a sequential transmission of a set of packets. The packet number is used at the receiving end to determine whether the packet is the original packet transmitted or a duplicate packet transmitted. When a new packet arrives at the receiving end, the packet number is compared with the packet number of the previously received packet. If the packet number received matches the packet number of the previously received packet, then the newly received packet is a duplicate, and can be discarded. If, on the other hand, the packet number received does not match the packet number of the previously received packet, then the newly received packet is either an original packet or a duplicate packet if the original packet was lost.

Figure 4:
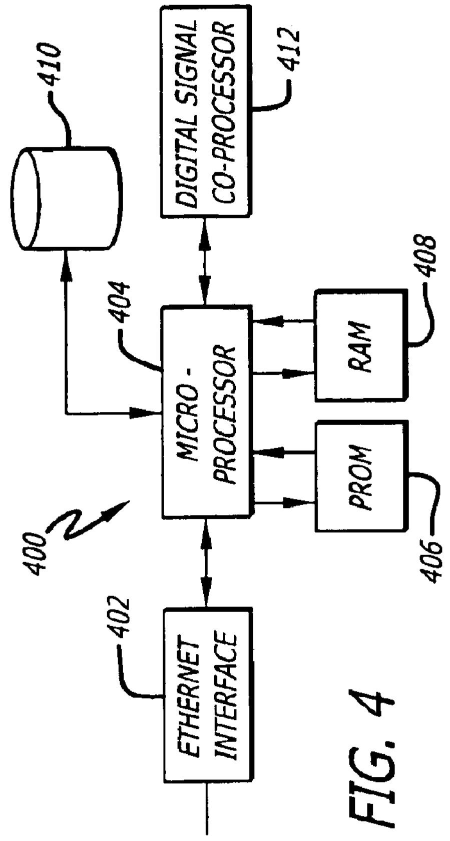
FIG. 4 illustrates a block diagram of an exemplary call processor server in accordance with the invention.

FIG. 4 illustrates a block diagram of an exemplary call processor server 400 in accordance with the invention. The call processor 400 comprises a network interface 402 (e.g. an Ethernet interface), a microprocessor 404 including associated programmable read only memory (PROM) 406 and random access memory (RAM) 408, a non-volatile computer readable memory 410, such as a magnetic hard disk, an optical disc such as a compact disk or digital versatile disc (DVD), or other permanent storage mediums, and optionally a digital signal processor 412.

In operation, voice packets are received at the network interface 402 and sent to the microprocessor 404. A computer program stored in the hard disk 410 and subsequently loaded into the RAM 408 causes the microprocessor 404 to optionally compress the audio data, analyze the voice data to determine the significance of the information to voice quality, and then makes a decision as to whether the significance of the information is above a threshold. The microprocessor 404 may use the digital signal co-processor 412 in order to speed up the compression of the audio data and the analysis of the significance of the information to voice quality. If the microprocessor 404 determines that the-significance of the information to voice quality is above the threshold level, the same voice packet is sent more than once, with a predetermined delay between transmitted packets. Otherwise, the voice packet is transmitted only once.

Figure 5:
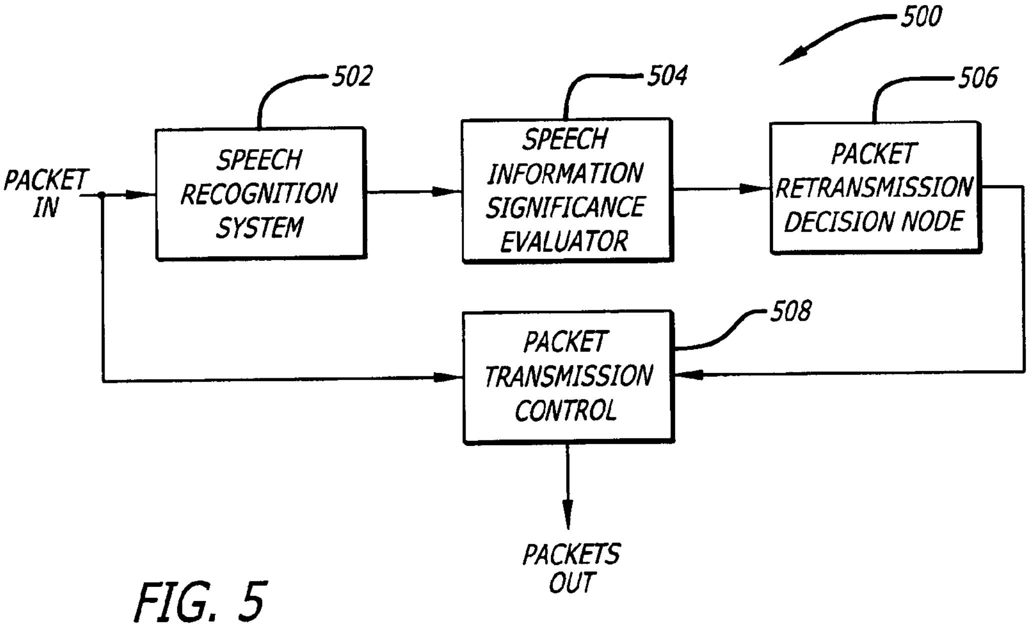
FIG. 5 illustrates a block diagram of an exemplary system for controlling the transmission of duplicate packets in accordance with the invention.

FIG. 5 illustrates a block diagram of an exemplary system 500 for controlling the transmission of duplicate packets in accordance with the invention. The system 500 can be implemented in hardware, or software and run on a microprocessor, such as the one used in the call processor 400. The system 500 comprises a speech recognition system 502, a speech information significance evaluator 504, a packet retransmission decision node 506, and a packet transmission control 508. The speech recognition system 502 analyzes the incoming speech information and breaks it down into linguistic units, such as phonemes.

The linguistic units are then sent to the speech information significance evaluator 504 to analyze the set of phonemes in the packet speech information and assign the set a coefficient that indicates how significant the phonemes are to the voice quality. In the preferred embodiment, the speech information significance evaluator 504 includes a look-up table containing a list of the possible phonemes and corresponding significance coefficients. Using the table, the evaluator 504 determines the maximum significance coefficient found for phonemes of the received packet.

The maximum significance coefficient is sent to the packet retransmission decision node 506 to compare it to a threshold. If the coefficient is greater than the threshold, the packet retransmission decision node 506 issues a control signal instructing the packet transmission control 508 to transmit a duplicate voice packet. Otherwise, the packet retransmission decision node 506 does not issue the control signal. The threshold level can be adjusted to control the quality of the voice transmission. If high quality voice transmission is desired, then the threshold level is set relatively low so that the significance coefficient need not be that high to trigger the sending of a duplicate packet. If lower quality voice transmission is desired (which uses less bandwidth capacity), the threshold level is set relatively high so that the significance coefficient has to be relatively high to trigger the sending of a duplicate packet.

Figure 6:
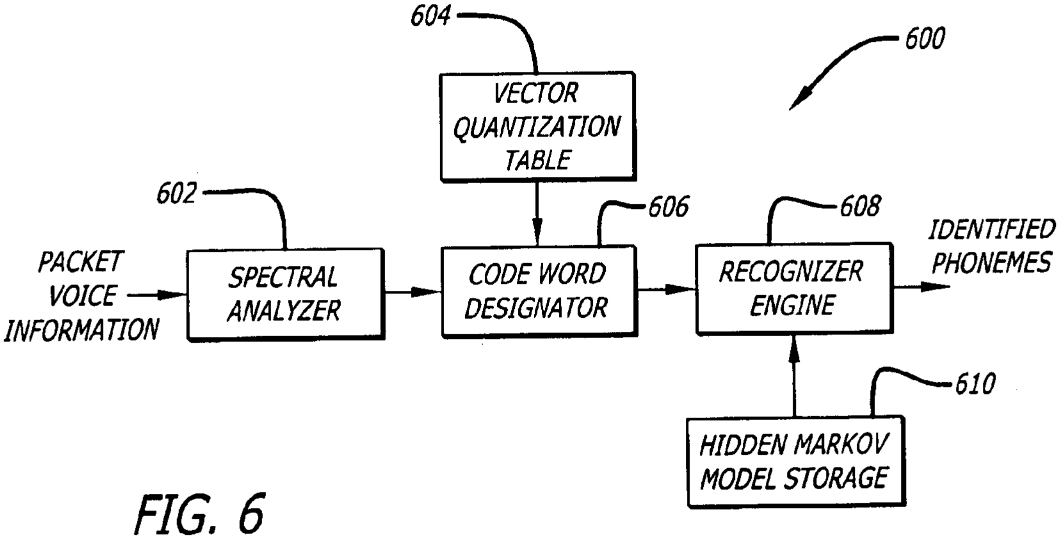
FIG. 6 illustrates a block diagram of a speech recognition system in accordance with the invention.

FIG. 6 illustrates a block diagram of a speech recognition system 600 in accordance with the invention. The speech recognition system 600 comprises a spectral analyzer 602, a vector quantization table 604, a codeword designator 606, a recognizer engine 608, and a hidden Markov model storage 610. Voice information from a packet is provided to the spectral analyzer 602, which typically uses a Fast Fourier Transform (FFT) algorithm to identify the voice signal energy in different frequency bands at various times. The vector quantization table 604 includes a list of codewords identifying a plurality of speech energy frequency. For each time frame of the measured speech signal, the codeword designator 606 compares the voice input signal energy with the list of codewords stored in the vector quantization table 604. The codeword designator 606 selects the codeword that best matches the voice input signal energy.

The recognizer engine 608 includes an algorithm to identify the corresponding linguistic unit from the best matched codeword received from the codeword designator 606. Preferably, the recognizer engine 608 uses an algorithm based on Hidden Markov Models. The Hidden Markov Model recognizer includes a training program such that it learns the speech patterns of the user to improve the identification of the proper linguistic units. The recognizer engine uses the Hidden Markov Model storage 610, which stores a lexicon (i.e. sets of phonemes for corresponding words), syntex information, phoneme level information and other parameters, to better identify the linguistic units of the incoming voice information. The output of the recognizer engine 608 are the identified phonemes corresponding to the input packet voice information. The identified phonemes are sent to the speech information significance evaluator 504 (shown in FIG. 5) which analyzes the identified phonemes for significant information to voice quality, as previously discussed.

A traditional hidden Markov speech recognition system can be used for identifying the phonemes of the corresponding input packet voice information. However, because the traditional hidden Markov speech recognition system is very computationally intensive, it is preferred that the traditional hidden Markov speech recognition system be modified to reduce the amount of calculations required. This can be done because an objective here is to recognize significant speech, rather than providing a high quality speech recognition system. Thus, although more errors would result than might be tolerated for speech recognition purposes, the modified hidden Markov speech recognition system is suitable for identifying significant speech in accordance with the invention.

More specifically, the recognition engine 608 has been modified in several ways. First, its output is phonemes rather than words. Second, the hidden Markov model storage 610 has relatively few stored words, containing a vocabulary of several thousand words or more rather than the twenty thousand words typically used in the traditional hidden Markov model recognition systems designed for dictation, such as the Dragon Systems or IBM ViaVoice recognition systems. Preferably, the subset of words are those that are most frequently used. Third, the modified hidden Markov system is designed to allow the recognition of phoneme strings that are not contained in the word-level vocabulary. Finally, it has relatively simple syntactical coding, only coding of the most frequent syntax information. This combination of modifications allows the system to produce a string of phonemes from input voice that requires much less computational capacity, and results in less delay, than is the case with more conventional recognizers.

Figure 7:
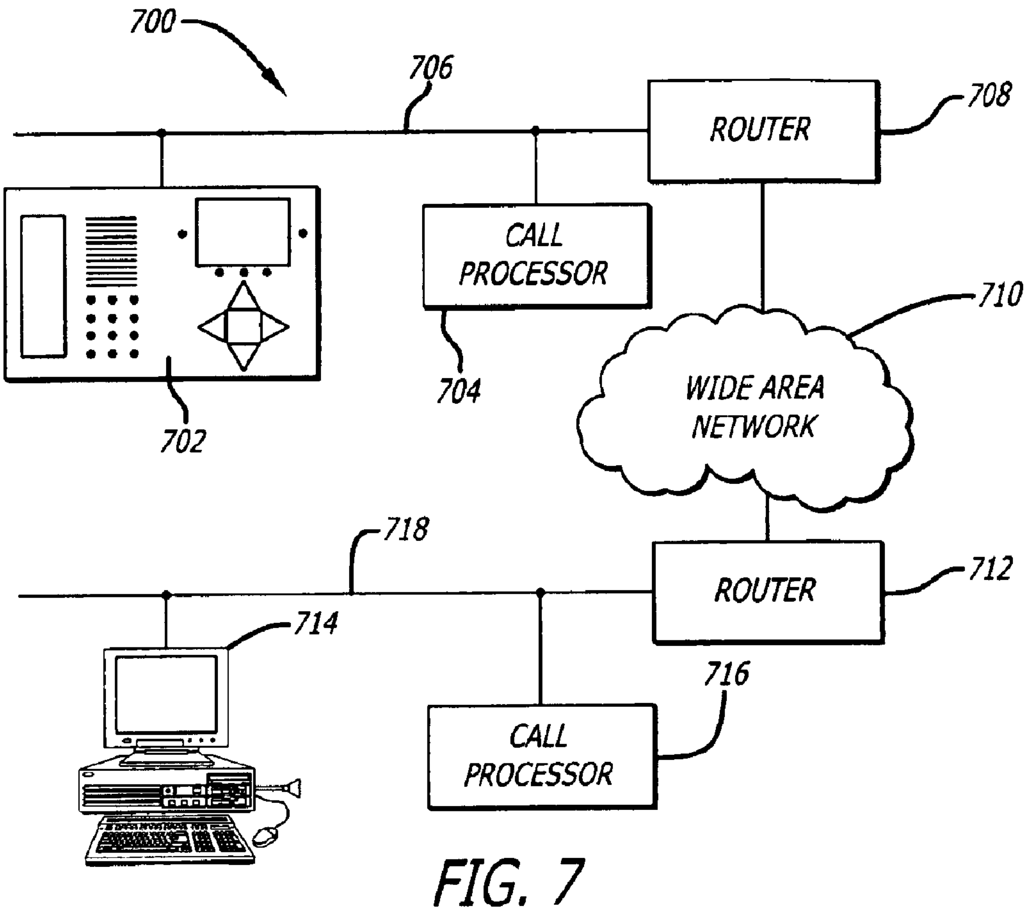
FIG. 7 illustrates a block diagram of another telecommunications system in accordance with the invention.

FIG. 7 illustrates a block diagram of another telecommunications system 700 in accordance with the invention. The telecommunications system 700 is similar to telecommunications system 100, in that it includes a network telephone 702 (e.g. a Nortel Networks model i2004 Etherphone), a call processor 704, a local area network (LAN) 706 (e.g. an Ethernet), a router 708 (or a series of routers bridges, switches, and/or other network devices), a wide area network 710 (such as a private network or a virtual private network using the Internet with appropriate encryption (e.g. a corporate intranet), or a public network such as the Internet), a router 712 (or a series of routers bridges, switches, and/or other network devices), and a call processor 716 on a local area network (LAN) 718. Telecommunications system 700 differs from telecommunications system 100 in that the system 700 includes a personal computer 714 connected to the LAN 718 at the receiving end.

Telecommunications system 700 operates in a similar fashion as well. A user at the network telephone 702 at the first location may desire a two-way telephony connection with a user at the computer 714 at the second location. Once the two-way telephony connection has been established, voice from the user at the network telephone 702 at the first location can be sent to the user at the computer 714 in the form of packets containing digitized segments of the voice.

This is accomplished by the network telephone 702 digitizing the user's voice and placing digitized segments of the voice into packets. The voice packets are then sent to the call processor via the LAN 706, which compresses the voice data and determines if it has significant speech for the transmission of one or more duplicate packets in accordance with the invention. The call processor 716 then sends the compressed voice packets (and possible duplicate packets) to the call processor 716 at the second location by way of the router 708, wide area network 710, and router 712. The call processor 716 decompresses the voice packets and sends them to the computer 714 which converts the packets into an analog voice signal, amplifies it, and presents it to the user at the second location by way of a speaker. If a duplicate packet is received, the call processor 716 checks if the packet number of the previously received packet is the same as the one just received. If it is, then it is a duplicate packet, and discards it. Otherwise, the duplicate packet undergoes processing.

When the user at the second location speaks, the computer 714 digitizes the analog voice signal and places the data into packets. The packets are then sent to the call processor 716 via the LAN 718, which compresses the voice data and determines if it has significant speech for transmission of duplicate packets in accordance with the invention. The packets (and possibly duplicate packets) are sent to the call processor 704 by way of the router 712, wide area network 710, and router 708. The call processor 704 decompresses the voice packets and sends them to the network telephone 702 which converts the packets into an analog voice signal, amplifies it, and presents it to the user at the second location by way of a speaker. If a duplicate packet is received, the call processor 704 checks if the packet number of the previously received packet is the same as the one just received. If it is, then it is a duplicate packet, and the system discards it. Otherwise, the packet undergoes processing.

Figure 8:
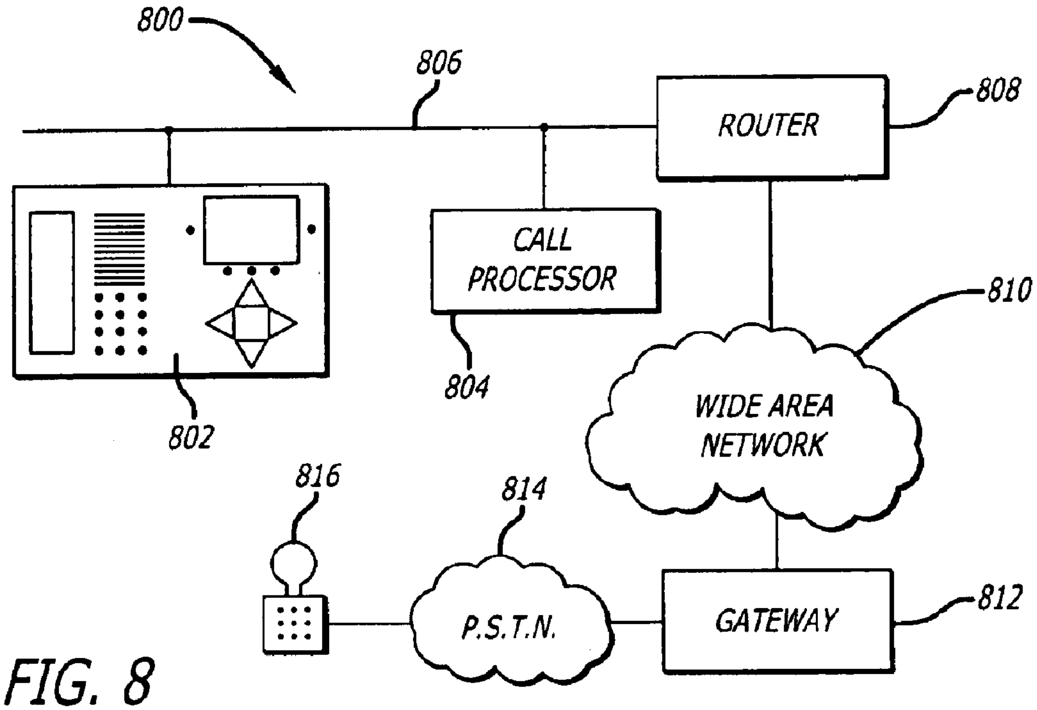
FIG. 8 illustrates a block diagram of yet another telecommunications system in accordance with the invention.

FIG. 8 illustrates a block diagram of yet another telecommunications system 800 in accordance with the invention. The telecommunications system 800 is similar to telecommunications system 100, and includes a network telephone 802 (e.g. a Nortel Networks model i2004 Etherphone), a call processor 804, a local area network (LAN) 806 (e.g. an Ethernet), a router 808 (or a series of routers bridges, switches, and/or other network devices), and a wide area network 810. The telecommunications system 800 differs from telecommunications system 100 in that the second end includes a standard telephone 816 coupled to the public switched telephone network (P.S.T.N.) 814 which, in turn, is coupled to a gateway 812. The gateway 812 is coupled to the wide area network 810 possibly by way of a series of routers, bridges, switches, and/or other network devices.

In operation, a user at the network telephone 802 at the first location may desire a two-way telephony connection with a user of the standard telephone 816 at the second location. Once the two-way telephony connection has been established, voice from the user at the network telephone 802 can be sent to the user at the standard telephone 816 in the form of packets containing digitized segments of the voice to at least the gateway 812 and in P.S.T.N. form thereon as a standard telephone communications.

This is accomplished by the network telephone 802 digitizing the user's voice and placing digitized segments of the voice into packets. The voice packets are then sent to the call processor 804 via the LAN 806, which compresses the voice data and determines if it has significant speech for the transmission of one or more duplicate packets in accordance with the invention. The call processor 804 then sends the compressed voice packets (and possible duplicate packets) to the gateway 812 by way of the router 808 and the wide area network 810. The gateway 812 decompresses the voice packets and converts the information to either an analog or a conventional time division multiplex digital for transmission through the P.S.T.N. 814 to the standard telephone 816. The standard telephone 816 presents the audio to the user by way of its internal speaker. If a duplicate packet is received, the gateway 812 checks if the packet number of the previously received packet is the same as the one just received. If it is, then it is a duplicate packet, and discards it. Otherwise, the duplicate packet undergoes processing.

When the user at the second location speaks, the speech signal is sent in analog or conventional time division multiplex digital form to the gateway by way of the P.S.T.N. 814. The gateway 812 compresses the voice signal and places the data into packets. The gateway 812 also analyzes the voice information for the purpose of transmitting one or more duplicate packets in accordance with the invention. The packets (and possibly duplicate packets) are then sent to the call processor 804 via the wide area network 810, router 808, and LAN 806. The call processor 804 decompresses the voice packets and sends them to the network telephone 802 which converts the packets into an analog voice signal, amplifies it, and presents it to the user at the second location by way of a speaker. If a duplicate packet is received, the call processor 804 checks if the packet number of the previously received packet is the same as the one just received. If it is, then it is a duplicate packet, and discards it. Otherwise, the duplicate packet undergoes processing.

The process of determining whether a voice packet has significant information to voice quality and to send at least one duplicate packet if such is determined, can be performed in any computing device of a telecommunications system. For example, in telecommunications systems 100, 700, and 800, this process can be performed in the call processor and gateway as previously described, as well as in the network telephone, a computer, and other computing devices of the telecommunications system. The process can be implemented using only hardware, or a software program running on a computing device. The process can be implemented for voice information containing any language, and need not be limited to English. It could also be used for recognizing significant speech of numerous languages.

In the foregoing specification, the invention has been described with reference to specific embodiments thereof. It will, however, be evident that various modifications and changes may be made thereto departing from the broader spirit and scope of the invention. The specification and drawings are, accordingly, to be regarded in an illustrative rather than a restrictive sense.

It is claimed:

1. A method of establishing a telephone communication using a packet switching communications network, comprising:

digitizing voice information received from a speaker;

placing the voice information into a payload of a first packet;

transmitting the first packet to a recipient;

calculating a significance to voice quality of the voice information contained in the first packet; and transmitting one or more additional packets to the recipient containing the voice information if the significance of the voice information is above a threshold level; wherein calculating the significance to voice quality of the voice information comprises:

identifying one or more phonemes contained in the voice information;

retrieving a value from memory for each identified phoneme representing the significance to voice quality of that phoneme; and setting the measure of significance for the voice information to the maximum of the values for all of the phonemes contained in the voice information.

2. The method of claim 1, wherein the identification of the phonemes in the voice information is performed by a hidden Markov model speech recognition system.

3. The method of claim 1, wherein a delay is introduced after the transmission of said first packet and before at least one of the additional packets containing the voice information.

4. The method of claim 1, wherein the packet switching communications network comprises at least one local area network and a wide area network.

5. The method of claim 4, wherein the local area network comprises an Ethernet.

6. The method of claim 4, wherein the wide area network comprises a corporate Intranet.

7. The method of claim 1, wherein the transmission of the first packet is carried out by a network telephone connected directly to a local area network, and calculating the significance to voice quality and transmission of the one or more additional packets is carried out by a server elsewhere in the local area network.

8. The method of claim 1, wherein the source of the speech is a telephone and origination of all packets and calculating the significance to voice quality is carried out by a server elsewhere in the network.

9. The method of claim 1, wherein a source of the voice information is a personal computer and origination of all packets and calculating the significance to voice quality is carried out by the personal computer.

10. A computing device comprising a processor for determining a significance to voice quality of voice information contained in a first packet and for transmitting one or more additional packets containing the voice information if the significance of the voice information is above a threshold level; wherein said processor is capable of:

identifying one or more phonemes contained in the voice information;

retrieving a value from memory for each identified phoneme representing the significance to voice quality of that phoneme; and setting the measure of significance for the voice information to the maximum of the values for all of the phonemes contained in the voice information.

11. The computing device of claim 10, wherein said processor is capable of identifying the phonemes in the voice information using a hidden Markov model speech recognition system.

12. The computing device of claim 10, wherein said processor is capable of introducing a delay after the transmission of said first packet and before at least one of the additional packets containing the voice information.

13. The computing device of claim 10, wherein said processor is capable of transmitting said first packet and said one or more additional packets through a packet switching communications network.

14. The computing device of claim 10, wherein said packet switching communications network comprises at least one local area network and a wide area network.

15. The computing device of claim 14, wherein the local area network comprises an Ethernet.

16. The computing device of claim 14, wherein the wide area network comprises a corporate Intranet.

17. The computing device of claim 10, wherein said processor comprises:

a network interface for transmitting and receiving packets; and a microprocessor for receiving said first packet from said network interface, for determining the significance to voice quality of the voice information contained in a packet, and for transmitting through said network interface one or more additional packets containing the voice information if the significance of the voice information is above a threshold level.

18. The computing device of claim 17, further including a digital signal co-processor for assisting in determining the significance to voice quality of the voice information contained in a packet.

19. The computing device of claim 10, wherein said processor comprises:

speech recognition system for identifying one or more linguistic units of the voice information;

a speech information significance evaluator for evaluating the significance of the identified one or more linguistic units to voice quality;

a packet retransmission decision node for generating a control signal if said significance is above said threshold; and a packet transmission control for transmitting one or more additional packets in response to said control signal.

20. The computing device of claim 19, wherein said speech recognition system comprises:

a spectral analyzer for identifying frequency responses of said voice information;

a vector quantization table for storing a list of codewords associated prototypical frequency responses; and a codeword designator for selecting optimal codewords from said list of codewords whose frequency response best matches said frequency response of said voice information; and a recognizer engine for generating said one or more linguistic units from said optimal codewords.

21. The computing device of claim 19, wherein said one or more linguistic units comprises one or more phonemes.

22. A computer readable medium comprising a software program including a first routine for calculating the significance to voice quality of voice information contained in a first packet; and a second routine for transmitting one or more additional packets to the recipient containing the voice information if the significance of the voice information be above a threshold level; wherein said first routine comprises the following subroutines:

a first sub-routine for identifying one or more phonemes contained in the voice information;

a second sub-routine for retrieving a value from memory for each identified phoneme representing the significance to voice quality of that phoneme; and a third sub-routine for setting the measure of significance for the voice information to the maximum of the values for all of the phonemes contained in the voice information.

23. The computer readable medium of claim 22, wherein the first sub-routine identifies the phonemes in the voice information by implementing a hidden Markov model speech recognition system.

24. The computer readable medium of claim 22, wherein further including a routine for delaying the transmission of said one or more additional packets containing said voice information after said first packet has been transmitted.

* * * * *